(12) United States Patent
Li et al.

(10) Patent No.: US 8,869,049 B1
(45) Date of Patent: Oct. 21, 2014

(54) AUTO-COMPLETION FOR USER INTERFACE DESIGN

(75) Inventors: Yang Li, Palo Alto, CA (US); Tsung-Hsiang Chang, Medford, MA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 13/283,807

(22) Filed: Oct. 28, 2011

(51) Int. Cl.
*G06F 3/00* (2006.01)

(52) U.S. Cl.
USPC ............ 715/762; 715/705; 715/765; 715/810

(58) Field of Classification Search
USPC ......... 715/705, 708, 709, 715, 762, 764, 765, 715/781, 786, 788, 810, 835, 838
See application file for complete search history.

(56) References Cited

U.S. PATENT DOCUMENTS

| | | | | |
|---|---|---|---|---|
| 6,892,169 | B1 * | 5/2005 | Campbell et al. ................. | 703/1 |
| 8,375,313 | B2 * | 2/2013 | Ngan ............................. | 715/762 |
| 8,413,062 | B1 * | 4/2013 | Little ............................ | 715/762 |
| 2008/0092057 | A1 * | 4/2008 | Monson et al. ................ | 715/744 |
| 2009/0094544 | A1 * | 4/2009 | Savage .......................... | 715/765 |

OTHER PUBLICATIONS

Cai, D., et al., "Extracting Content Structure for Web Pages based on Visual Representation," in the Fifth Asia Pacific Web Conference (APWeb2003). 2003, pp. 406-417.
Google, "Google sites" 2011, 2 pages, [online] [retrieved on Mar. 20, 2012] Retrieved from the Internet <URL:http://www.google.com/sites/help/intl/en/overview.html>.
Hashimoto, Y., et al., "Retrieving the Web Page Layouts using Sketches to Support Example-based Web Design," Eurographics Workshop on Sketch-Based Interfaces and Modeling, 2005, 10 Pages, can be retrieved at <URL:http://www-ui.is.s.u-tokyo.ac.jp/~takeo/papers/hashimoto-sbm2005-layout.pdf>.
Kumar, R., et al., "Bricolage: Example-Based Retargeting for Web Design," CHI 2011, May 7-12, 2011, 10 Pages, can be retrieved at <URL:http://hci.stanford.edu/publications/2011/Bricolage/Bricolage-CHI2011.pdf>.
Kumar, R., et al., "Automatic retargeting of web page content," in CHI'09 Work in Progress, Apr. 4-9, 2009. p. 4237-4242.
Van Duyne, D.K., et al., "The Design of Sites: Patterns, Principles, and Processes for Crafting a Customer-Centered Web Experience," 2002, pp. 16, 19-29, and 107-109, Boston, MA, USA Addison-Wesley Longman Publishing Co., Inc.
Buxton, B., "Sketching User Experiences: Getting the Design Right and the Right Design," 2007: Morgan Kaufmann, 8 Pages, Title Page, Cover Page and Table of Contents.
Hartmann, B., et al., "d.tools: Visually Prototyping Physical Uls through Statecharts," in Conference Supplement to UIST 2005: ACM Symposium on User Interface Software and Technology: Demonstrations, Oct. 23-27, 2005, 2 Pages.

(Continued)

*Primary Examiner* — Xiomar L Bautista
(74) *Attorney, Agent, or Firm* — Fish & Richardson P.C.

(57) ABSTRACT

Techniques for automatically completing a partially completed UI design created by a user are described. A UI query including attributes of UI components in the partially completed UI design is created. Design examples with similar UI components are identified. UI components of one such design example are displayed to automatically complete the partially completed UI design (also called an "auto-complete suggestion"). The user can systematically navigate the design examples and accept auto-completed suggestions to include into the partially complete UI design.

21 Claims, 12 Drawing Sheets

(56) References Cited

OTHER PUBLICATIONS

Lin, J., et al., "Employing Patterns and Layers for Early-Stage Design and Prototyping of Cross-Device User Interfaces," in CHI 2008 Proceedings Activity-Based Prototyping and Software, Apr. 5-10, 2008, pp. 1313-1322.

Ritchie, D., et al., "d.tour:Style-based Exploration of Design Example Galleries," in UIST'11, Paper Session: Social Learning, Oct. 16-19, 2011, pp. 165-173.

Russell, S., et al., "Artificial Intelligence: A Modern Approach," 2 ed. 2003, 26 Pages, Title Page, Cover Paper and Table of Contents.

Lee, B., et al., "Designing with Interactive Example Galleries," in CHI'10: Perspectives on Design, Apr. 10-15, 2010, p. 2257-2266.

Lin, J., et al., "Damask: A Tool for Early-Stage Design and Prototyping of Multi-Device User Interfaces," in Proceedings of The 8th International Conference on Distributed Multimedia Systems, International Workshop on Visual Computing, 2002, 8 Pages.

\* cited by examiner

AUTO-COMPLETION FOR USER INTERFACE DESIGN

TECHNICAL FIELD

The invention generally relates to the field of user interfaces, in particular to generating content for user interfaces.

BACKGROUND

Many user interface (UI) design applications have been developed for users to create UI designs. To help users to quickly create UI designs, many UI design applications allow the users to edit or customize existing UI examples in order to create their own. However, due to the large volume of existing design examples (e.g., billions of web pages), it is difficult for the users to find desirable UI designs in the design examples. Currently, there is no effective technique for a user to effectively and easily leverage existing design examples to create their own UI designs.

SUMMARY OF THE INVENTION

Embodiments of the present disclosure include methods (and corresponding systems and computer program products) for automatically completing a partially completed user interface design created by a designer.

In one aspect, a command is received to automatically generate a complete design from an incomplete UI design that includes a first UI component. A plurality of example designs are identified that contain a second UI component similar to the first, and a third UI component from the example design is provided for display in the incomplete UI design. Scrollbars are provided for selection of one of the plurality of example designs and the third component is incorporated with the incomplete design upon user confirmation.

In another aspect, a combination score categorizing similarity between example designs is used to group the example designs.

In still another aspect, the example designs are grouped based on properties including layout style, background style, background color, font size, and font style.

In a further aspect, an incomplete UI includes a first set of UI components. A plurality of example designs are identified, each with a second set of UI components that are similar to the first set, and an additional UI component. A corresponding transformation cost is calculated for each of the design examples. The design examples are presented and user controls provided whereby a user selects and confirms an additional component to incorporate with the incomplete UI design.

In yet another aspect, the transformation cost comprises contributions from one or more of the following factors: a cost associated with adding a UI component, a cost associated with deleting a UI component, a cost associated with translating a UI component, and a cost associated with scaling a UI component.

A related method receives a command to automatically generate a design for an incomplete UI design comprising a user-selected component. A design example including a corresponding UI component and a recommended UI component is identified, and the recommended UI component is provided for display in the incomplete UI design.

In one aspect of the related method, differences between text and images in the user-selected and corresponding UI components do not contribute to the transformation cost. In another aspect, text and images in the recommended UI component are replaced by default text and images when provided for display.

Another related method determines attributes of UI components in a plurality of design examples, receives a query for automatically generating a design for the incomplete UI, the query including information about a first set of UI components of the incomplete UI, and identifies a design example that has a second set of UI components, similar to the first set of UI components, and also has a third UI component for proposed inclusion in the incomplete UI design.

System elements identify and harvest the design examples, and group them based on common characteristics.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
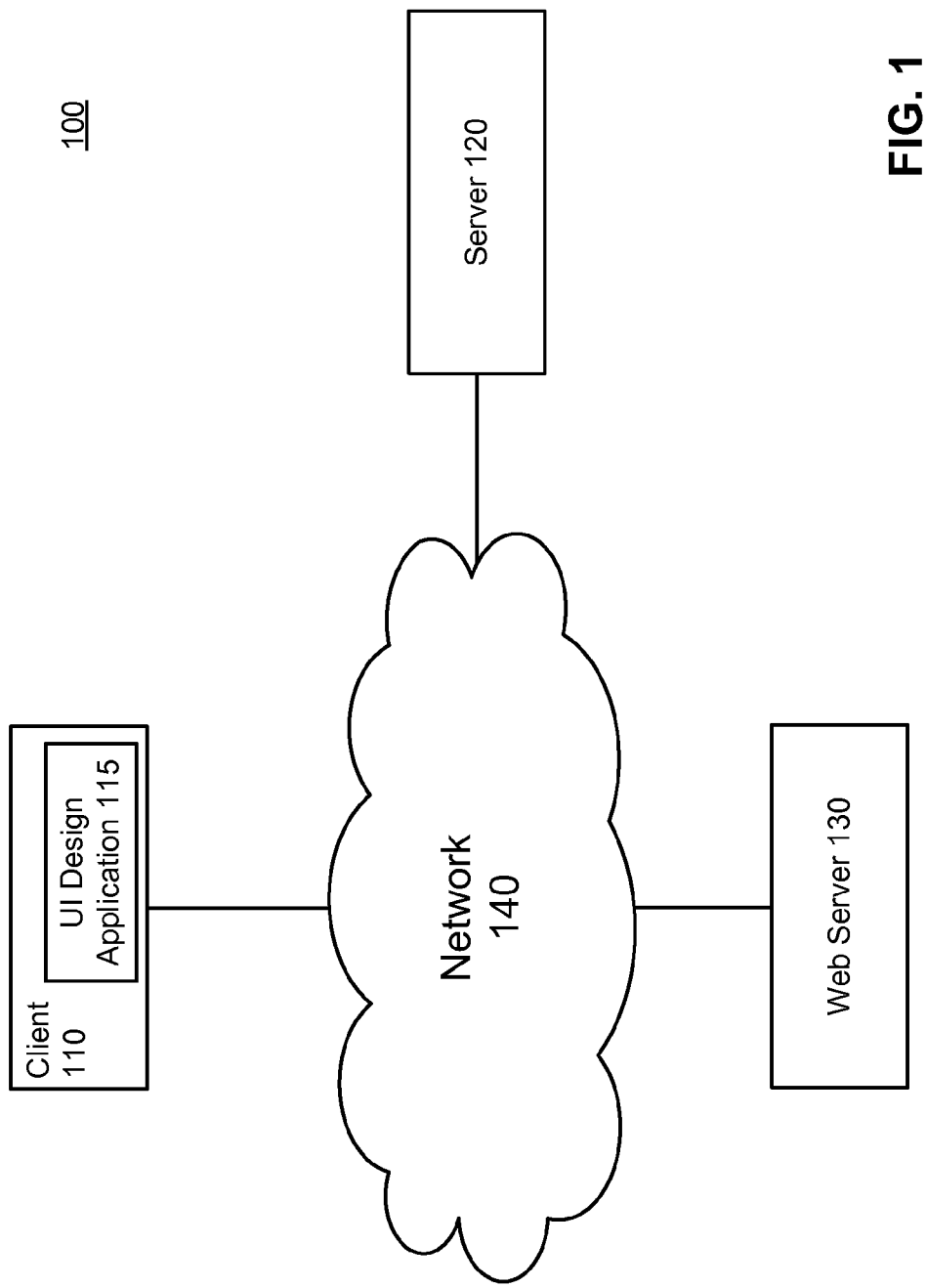
FIG. 1 is a high-level block diagram of a computing environment according to one embodiment.

FIG. 1 is a high-level block diagram that illustrates a computing environment 100 for enabling a user to efficiently create a UI design by automatically completing a partially completed UI design created by the user using design examples and enabling the user to incorporate desirable designs from the design examples into the UI design. As shown, the computing environment 100 includes a client 110, a server 120, and a web server 130, all connected through a network 140. There can be other entities in the computing environment 100.

The client 110 is an electronic device that can communicate with the server 120 through the network 140. In one embodiment, the client 110 is a conventional computer system executing, for example, a Microsoft Windows-compatible operating system (OS), Apple OS X, and/or a Linux distribution. In another embodiment, the client 110 is a mobile telephone or a tablet computer executing, for example, a Google Android operating system (OS). As shown, the client 110 includes a UI design application 115.

The UI design application 115 is a software program intended to be used by a user (also called the "designer") to create UI designs such as web pages. A UI design is a visual presentation of digital information. A UI design includes one or more components (also called "UI components") such as regions, texts, images, and buttons. A UI component itself may include one or more UI components. The former is called the parent UI component and the latter are called the children UI components. For example, a region (the parent UI component) may include multiple buttons (the children UI components). The arrangement of UI components within a UI (or a parent UI component) is called the layout of that UI. Each UI component has attributes that collectively define the display of the UI component in the UI design it belongs to. Example attributes include location, length, height, size, type, background color, font, semantic information and layout.

The UI design application 115 provides an auto-completion feature that automatically completes a partially completed UI design created by a designer. As the designer freely lays out UI components on an editing window (also called a "canvas"), the UI design application 115 automatically suggests the rest of the UI design (also called the "alto-complete suggestions") by rendering a suggested design on the canvas along with the UI components added by the designer. The designer can either ignore the suggested layout and keep finishing the design, or accept the suggested design as a part of the UI design. In addition, the auto-completion feature suggests additional alternative designs for the partially completed UI design by enabling the designer to select a region and systematically navigate through design examples for that region and selectively incorporating desirable designs identified by the designer into the UI design. In order to provide the auto-complete suggestions for a UI design, the UI design application 115 generates a UI query that includes attributes of the existing UI components in the partially completed UI design. The existing UI components include the UI components added by the designer and the UI components suggested by the UI design application 115 and accepted by the designer. The UI design application 115 submits the UI query to the server 120 and receives a collection of design examples, each of which includes UI components similar to the existing UI components. The UI design application 115 fills the partially completed UI design using UI components in one of the received design examples, and enables the user to select regions in the resulting UI design and view alternative designs for the selected regions. The user can choose to incorporate the suggested designs for one or more regions in the UI design by accepting (or confirming) the desired suggestions, or ignore the auto-complete suggestions altogether and completing the UI design manually.

The server 120 is a hardware device and/or software program configured to communicate with the client 110 and the web server 130 through the network 140. The server 120 creates a design example corpus by retrieving contents such as web pages hosted on the web server 130 and indexes the contents in an index against UI components included therein. The server 120 receives UI queries from the client 110 regarding UI designs and searches in the index for design examples containing UI components similar (e.g., location, background color, and/or font) to the existing UI components specified in the UI queries. The server 120 scores each design example in the search results by calculating a minimum transformation cost for transforming the existing set of UI components specified in the UI query into a corresponding set of UI components in the design example, which may involve operations such as adding, deleting or geometrically transforming (translation and/or scaling) one or more UI components.

In one embodiment, the minimum transformation cost is a value between the range of 0 and 1, with a small value indicating a high degree of similarity (i.e., less transformation operations necessary) and a high value indicating a low degree of similarity. The server 120 removes the design examples with minimum transformation costs exceeding a predetermined threshold value from the search results, and returns the remaining design examples to the client 110. The web server 130 is a hardware device and/or software program configured to deliver contents such as web pages over the network 140. In an alternative embodiment, a pre-selected number (N) of design examples are returned to the client 110. The server 120 selects the N design examples with the lowest minimum transformation cost, i.e. those with the greatest degree of similarity.

The network 140 is a system of interconnected computer networks that use standard communications technologies and/or protocols to facilitate data transmission among the computer networks. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

Computer Architecture

Figure 2:
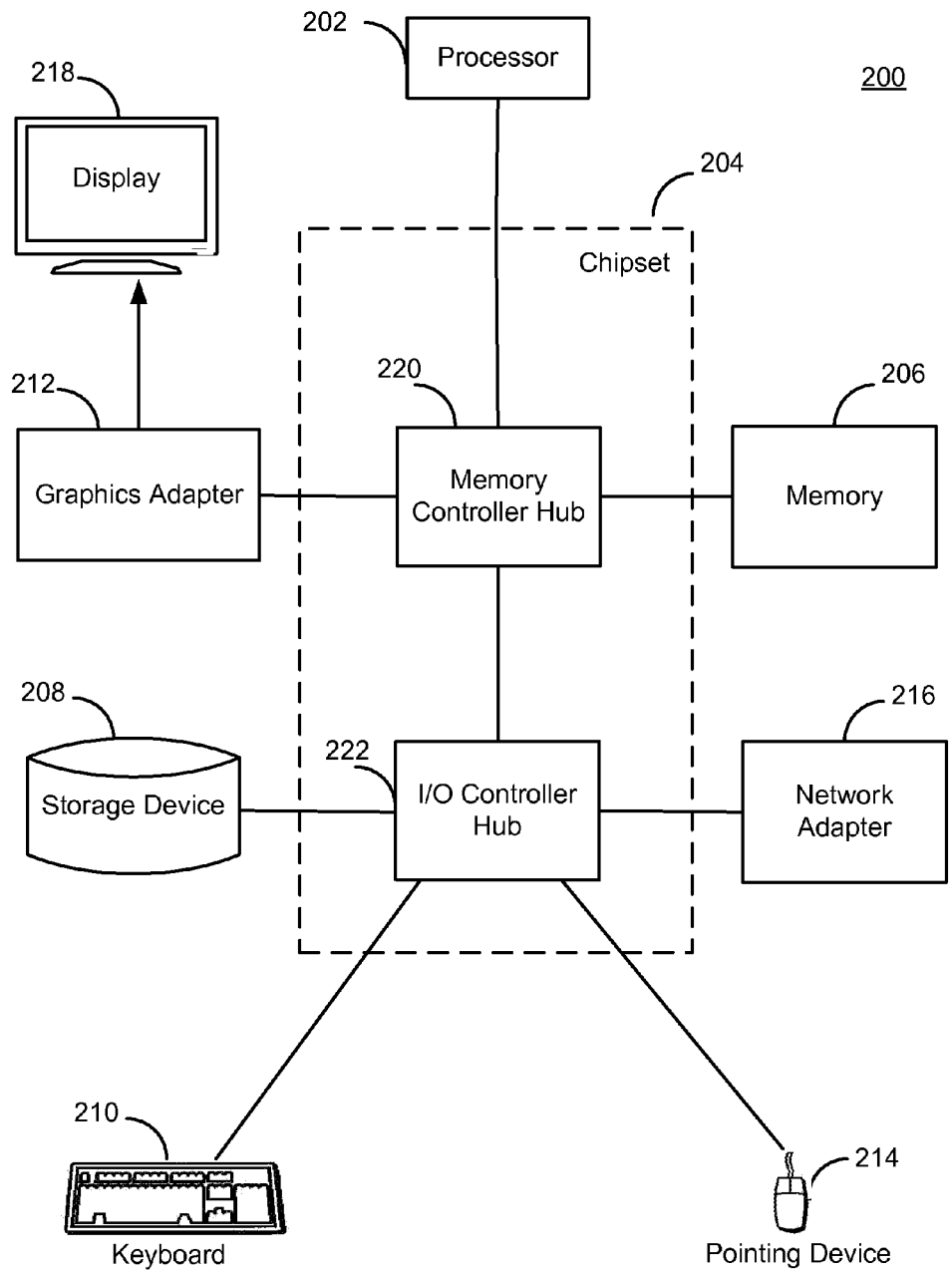
FIG. 2 is a high-level block diagram illustrating an example of a computer for use in the computing environment shown in FIG. 1 according to one embodiment.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 120 might comprise multiple blade servers working together to provide the functionality described herein. The computers 200 can lack some of the components described above, such as keyboards 210, graphics adapters 212, and displays 218.

Example Architectural Overview of the UI Design Application

Figure 3B:
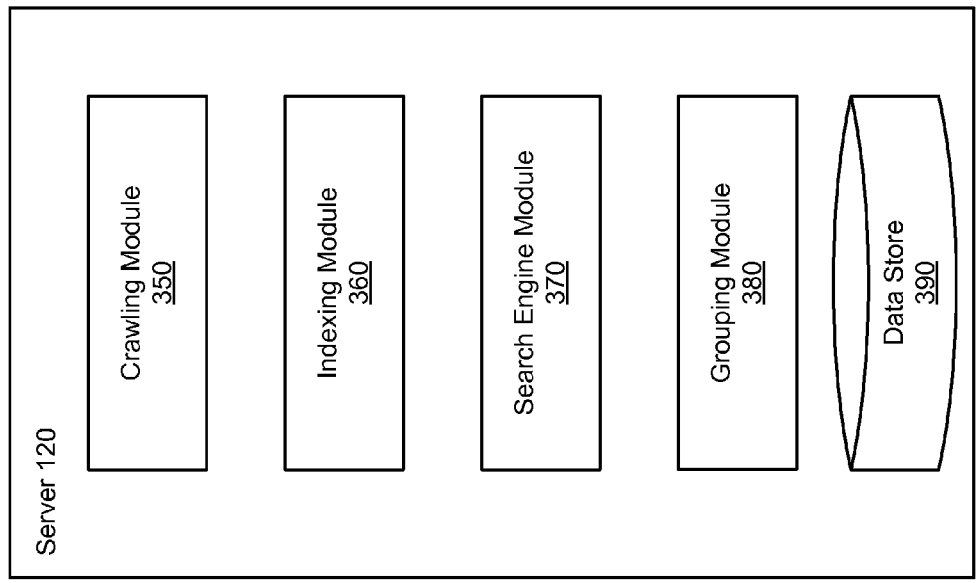
FIG. 3B is a high-level block diagram illustrating modules within a server shown in FIG. 1 according to one embodiment.
Figure 3A:
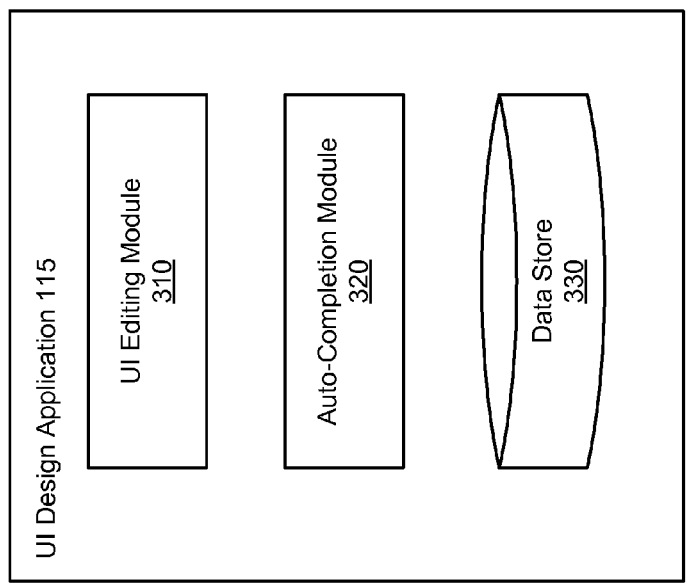
FIG. 3A is a high-level block diagram illustrating modules within a UI design application shown in FIG. 1 according to one embodiment.

FIG. 3A is a high-level block diagram illustrating a detailed view of modules within the UI design application 115 according to one embodiment. Some embodiments of the UI design application 115 have different and/or other modules than the ones described herein. Similarly, the functions can be distributed among the modules in accordance with other embodiments in a different manner than is described here. As illustrated, the UI design application 115 includes a UI editing module 310, an auto-completion module 320, and a data store 330.

Figure 5A:
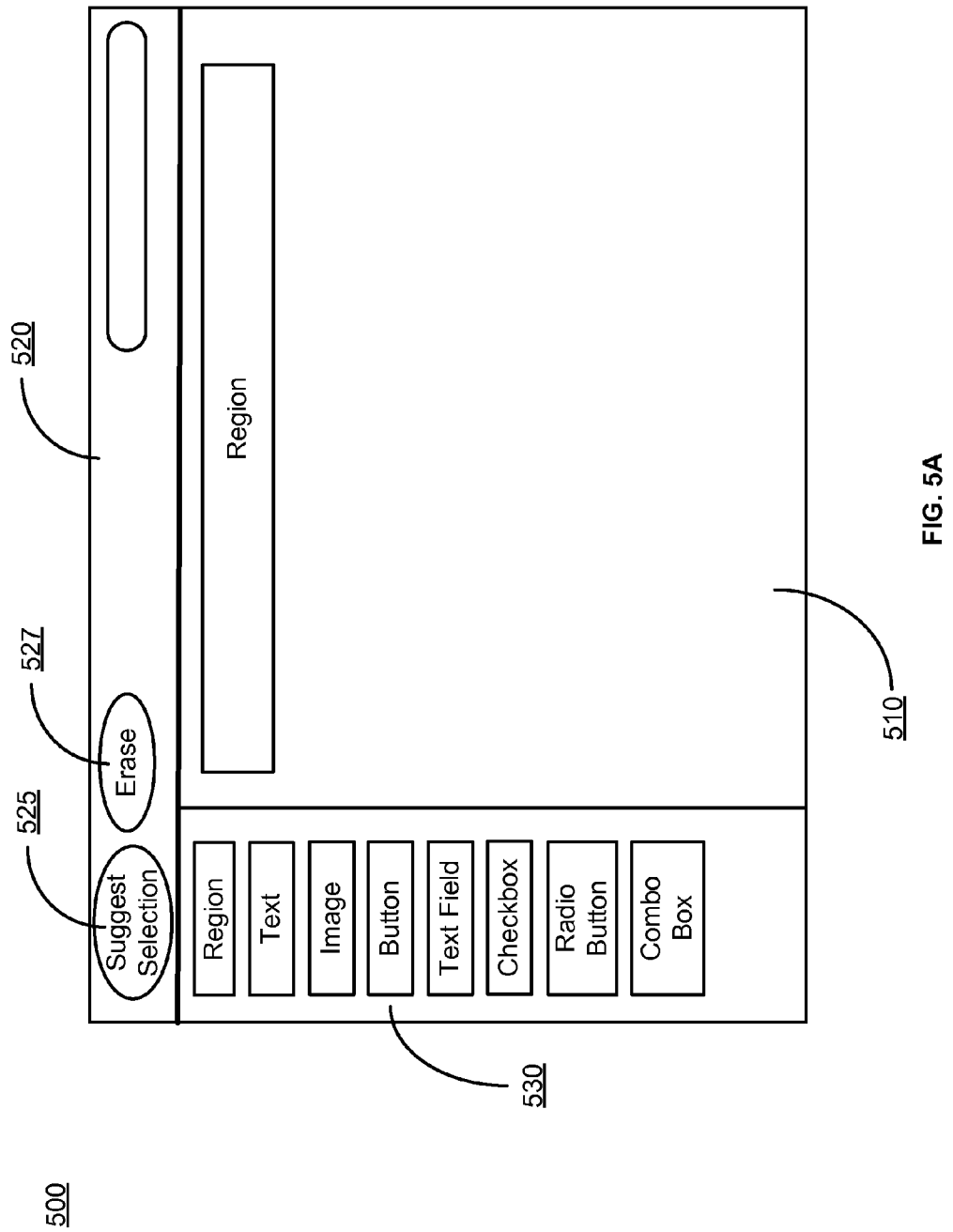
FIGS. 5A through 5G are diagrams illustrating displays of the UI design application shown in FIG. 1, according to one embodiment.

The UI editing module 310 displays a window on a display of the client 110. The window includes an editing window (also called a "canvas", a "working area") along with a component menu listing UI components that the user can add onto a UI design. The window also includes an auto-completion menu with commands for the user to accept or erase the auto-completion suggestions. An example window 500 is illustrated in FIG. 5A. As shown, the example window 500 includes a canvas 510, a component menu 530, and an auto-completion menu 520. The auto-completion menu 520 includes a suggestion selection button 525 and an erase button 527 for erasing a suggested design.

Referring back to FIG. 3, the auto-completion module 320 automatically completes a partially completed UI design created by the designer and enables the designer to selectively incorporate suggested designs into the UI design. When the UI editing module 310 receives user inputs creating a partially completed UI design, the auto-completion module 320 generates a UI query including attributes of existing UI components in the partially completed UI design, transmits the UI query to the server 120, and retrieves a set of design examples containing suggested designs for completing the partially completed UI design from the server 120. The auto-completion module 320 selects a design example (e.g., the design example with the minimum transformation cost) in the set and fills the partially completed UI design with UI components of the selected design example.

Figure 5B:
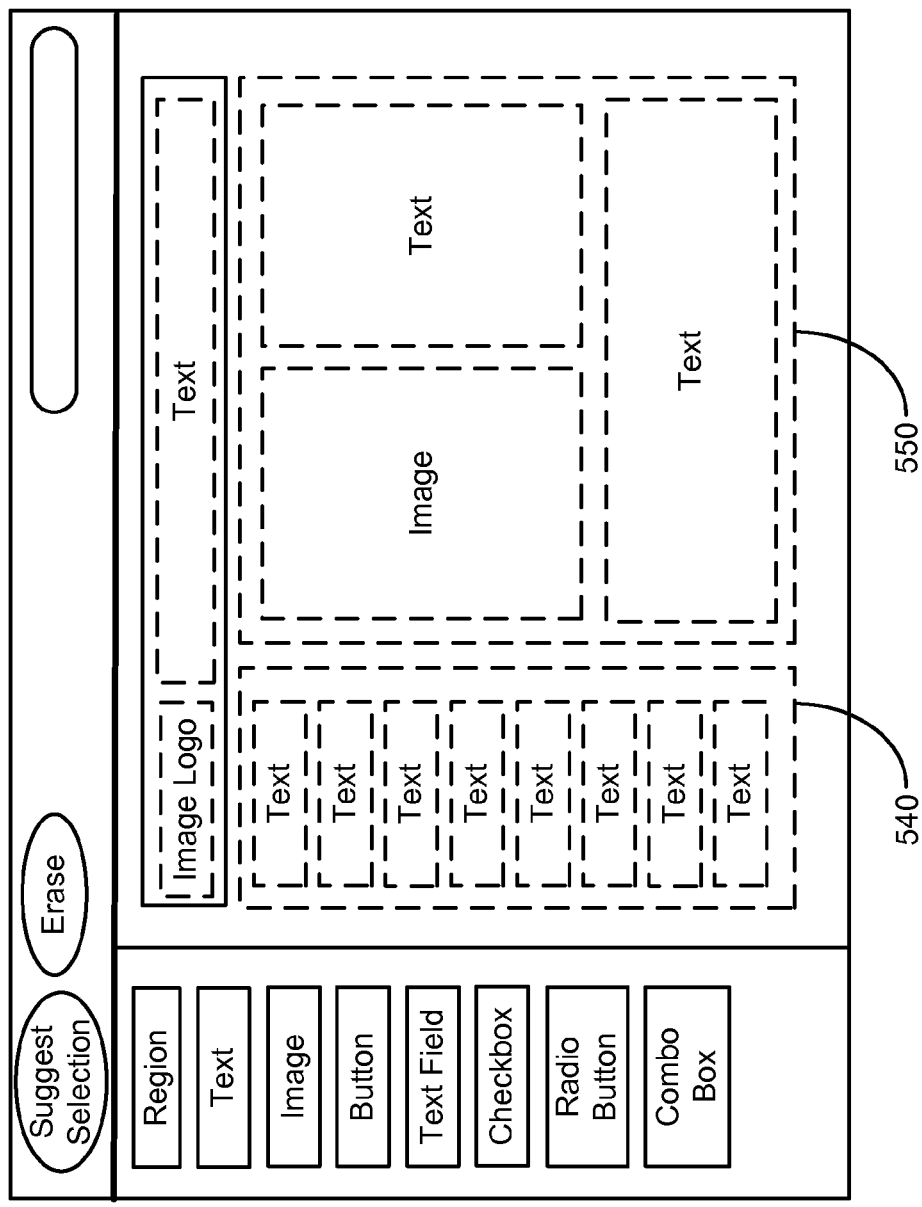

FIG. 5B illustrates an automatically completed UI design. As shown, the existing UI components and the suggested UI components are visually distinguishable: the existing UI components are in solid lines and the suggested UI components are in dotted lines.

Figure 6:
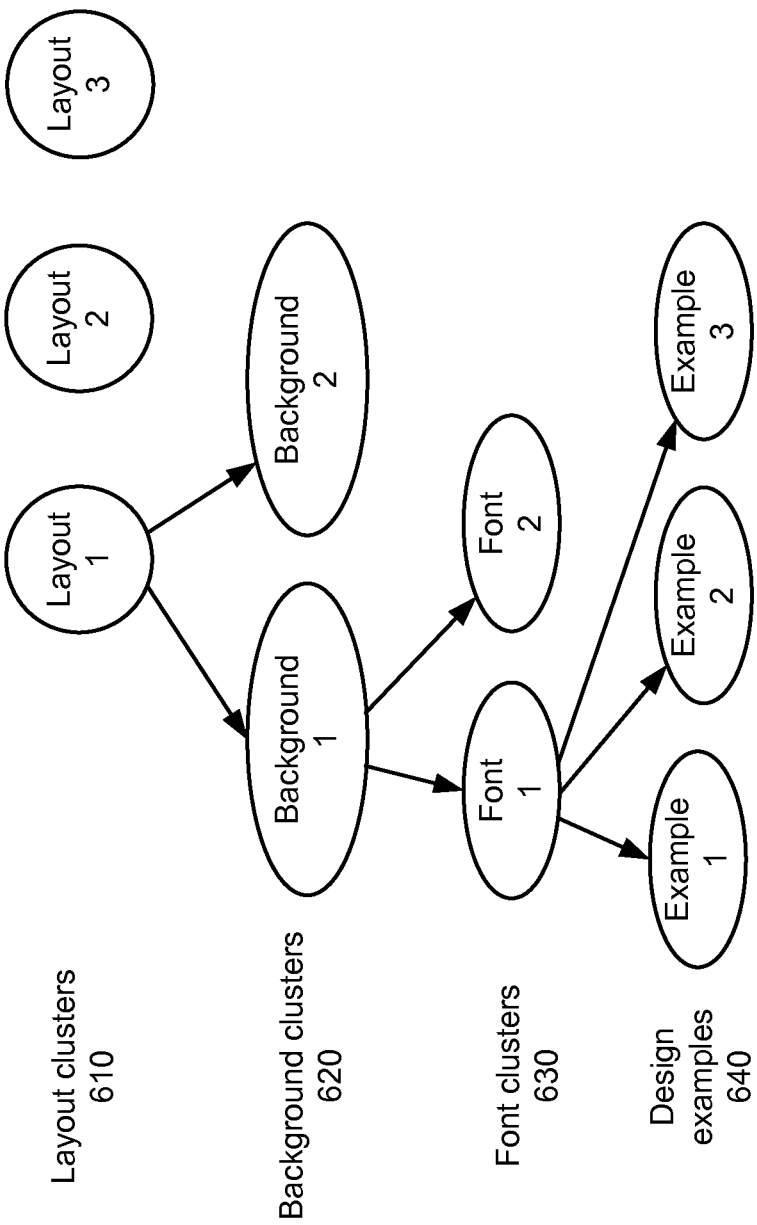
FIG. 6 is a diagram illustrating a structure of grouped design examples, according to one embodiment.

In one embodiment, the UI components in the retrieved design examples are grouped into different regions (e.g., regions 540 and 550 in FIG. 5B), and the retrieved design examples are grouped (and/or sub-grouped) according to their design similarities in terms of attributes such as layout, color, and font in these regions. FIG. 6 illustrates an example organization of the retrieved design examples for one such region. As shown, the design examples are grouped into different layout groups or clusters 610 according to their similarity in the layouts of UI components contained in the region. Additional details about how the design examples are grouped into the layout groups are provided below with regard to the server 120. Within each layout group, the design examples are further grouped into different background groups 620 according to their similarities in the backgrounds (e.g., background color) of said region. Within each background group, the design examples are further grouped into different font groups 630 according to their similarities in their text fonts (e.g., size, style) of said region. Each group (or subgroup) has one or more representative design examples 640.

Figure 5C:
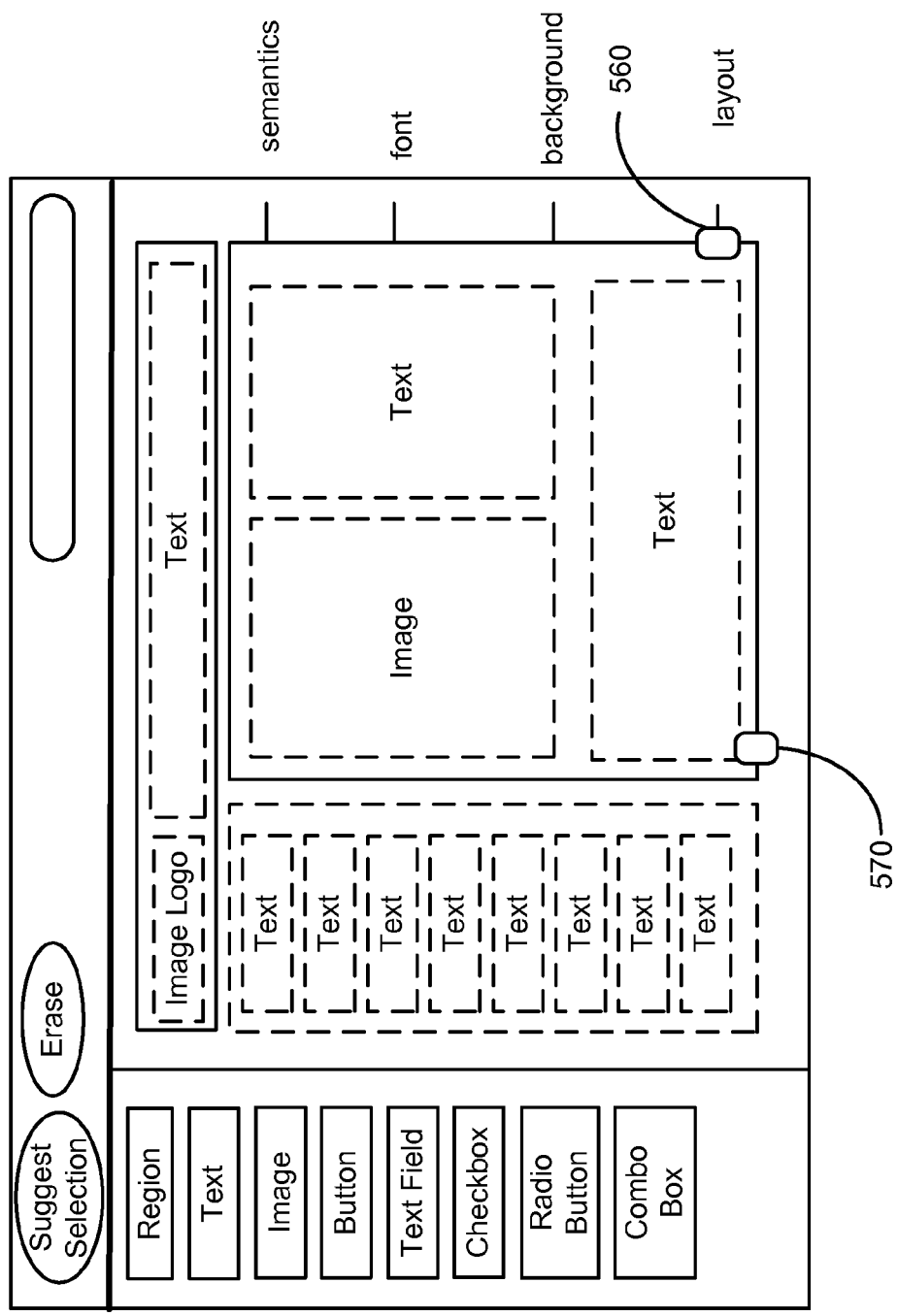
Figure 5D:
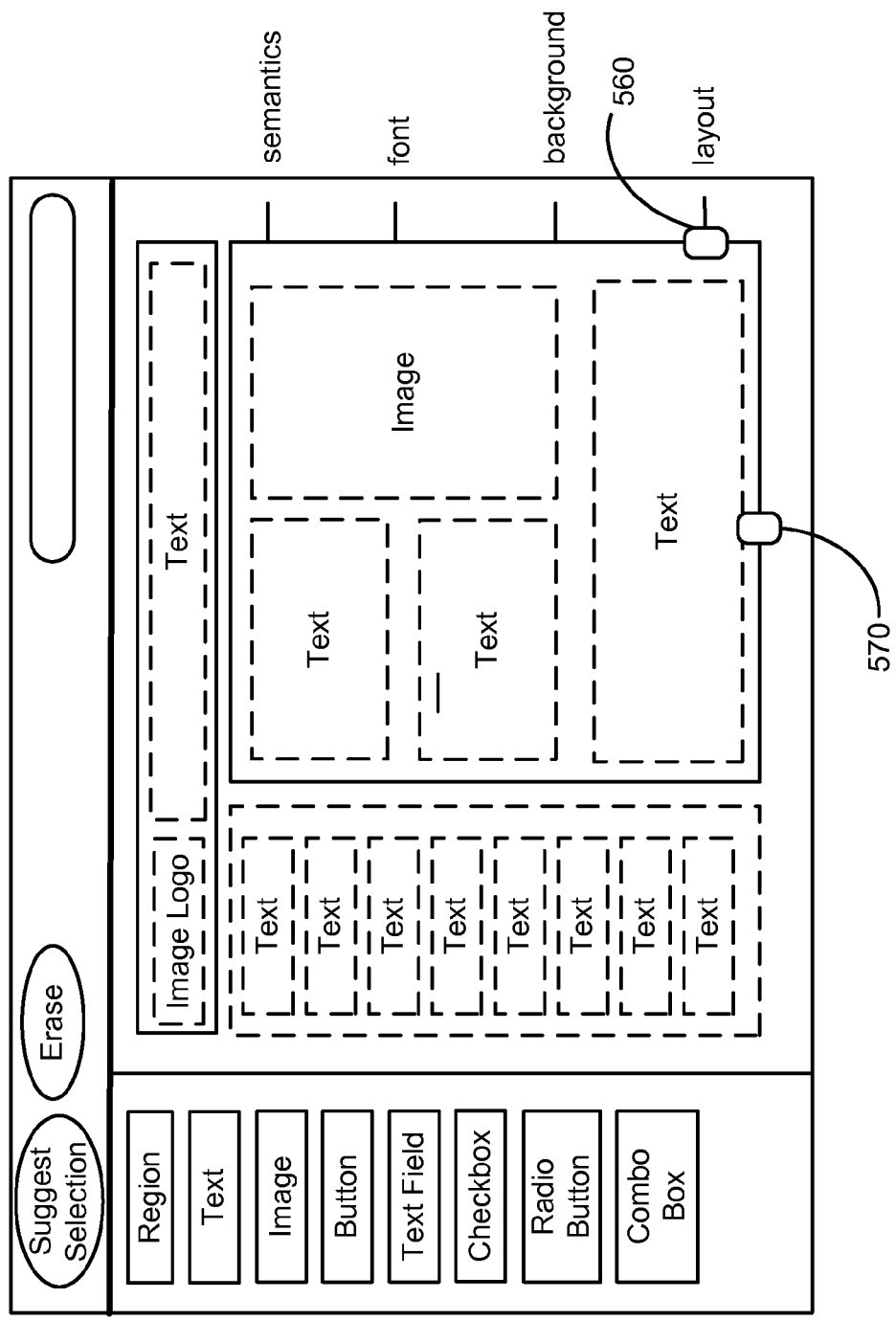
Figure 5E:
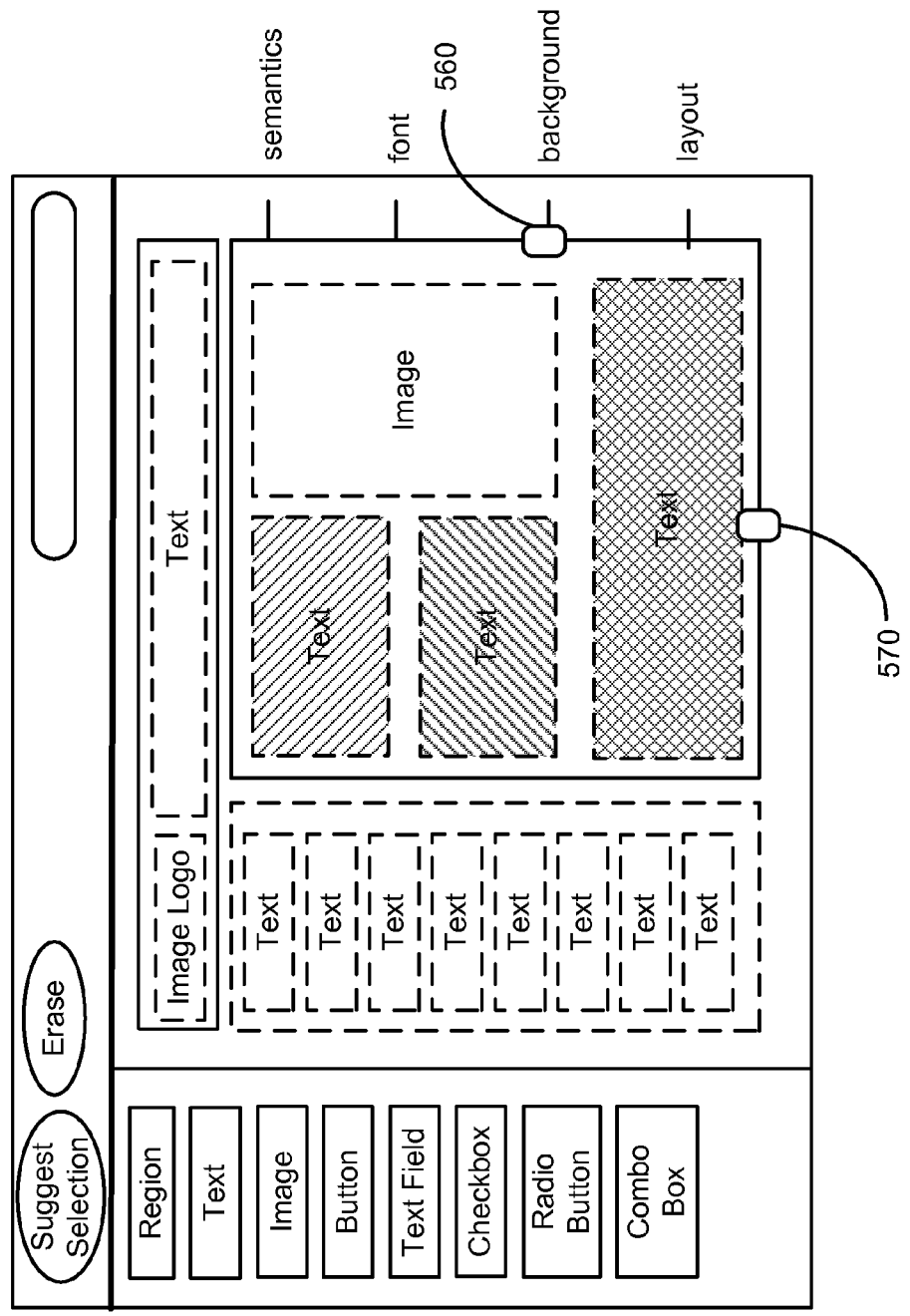
Figure 5F:
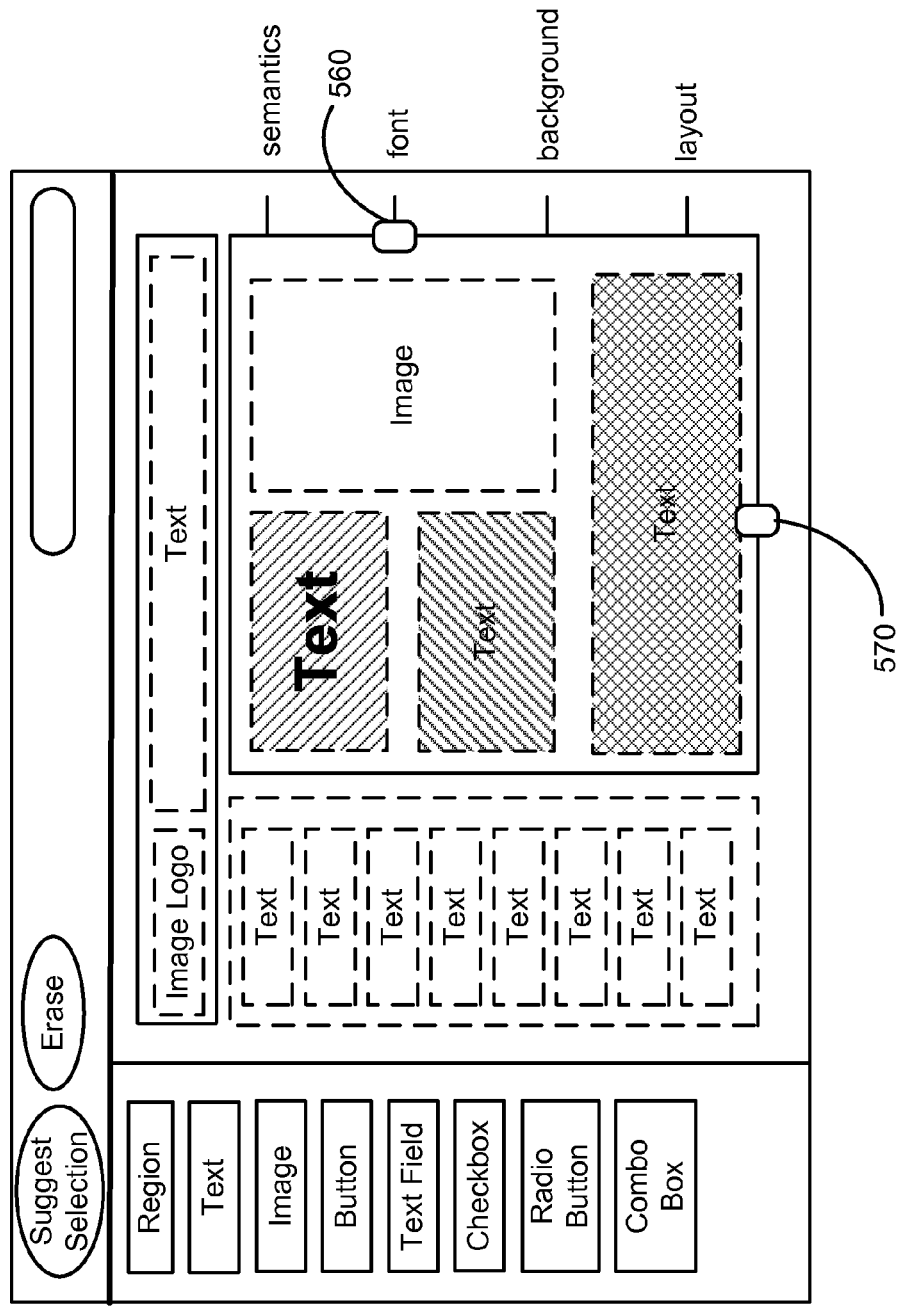
Figure 5G:
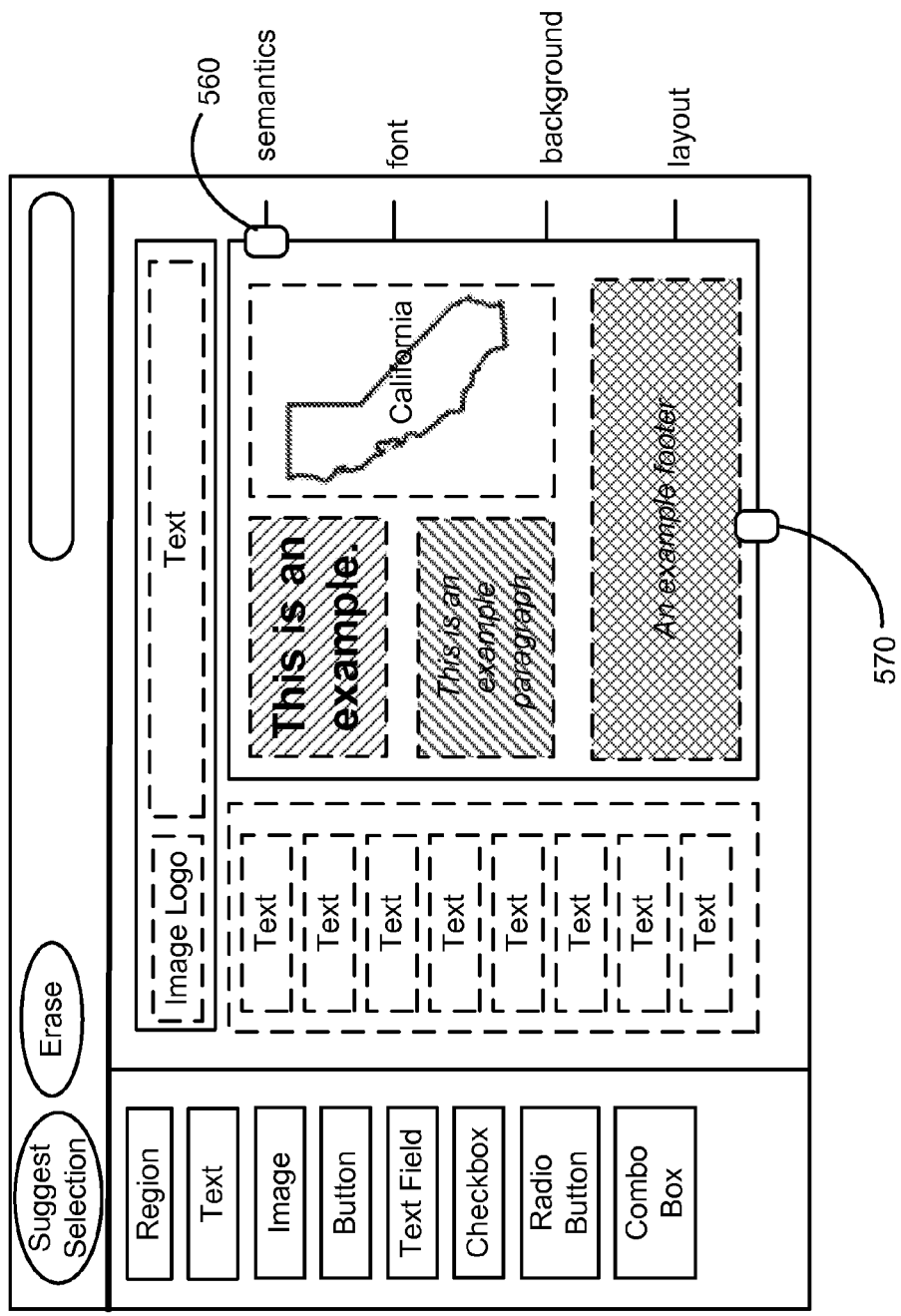

The auto-completion module 320 enables the designer to systematically navigate through the retrieved design examples according to their groupings by interacting with a vertical scrollbar (also called a "detail slider") 560 and a horizontal scrollbar (also called an "example slider") 570, as illustrated in FIG. 5C. The detail slider 560 can be in four detail levels: a layout level, a background level, a font level, and a semantic level. As illustrated in FIG. 5D, starting with the layout level, the designer can scroll the example slider 570 to view the representative design examples of the different layout groups in the selected region. Once the designer finds a desirable layout, the designer scrolls the detail slider 560 to the background level, as shown in FIG. 5E. The designer then scrolls the example slider 570 to view the representative design examples of the different background groups in the selected layout group. Similarly, once the designer finds a desirable background, the designer scrolls the detail slider 560 to the font level, as shown in FIG. 5F. The designer views the representative design examples of the font groups in the selected background group and selects one of the presented options. Finally, once the designer has found a desirable font, the designer scrolls the detail slider 560 to the semantic level as shown in FIG. 5G. The designer views the individual design examples of the selected font group and selects a desirable design (layout, background, font, and/or semantic) to incorporate with the partially completed UI design by selecting the suggest selection button 525. Otherwise, if the designer is not interested in any of the suggested designs, the designer can ignore the suggestions all together by selecting the erase button 527, and add UI components manually through the component menu 530. The UI design application 115 can make further suggestions based on the designer's decision regarding the auto-complete suggestions.

The data store 330 stores data used by the UI design application 115. Examples of such data include information about the partially completed UI design (e.g., attributes of UI components included therein), the UI query generated for the partially completed UI design, and the design examples received for the generated UI query. The data store 330 may be a relational database or any other type of database, or an in-memory data-structure.

Example Architectural Overview of the Server

FIG. 3B is a high-level block diagram illustrating a detailed view of modules within the server 120 according to one embodiment. Some embodiments of the server 120 have different and/or other modules than the ones described herein. Similarly, the functions can be distributed among the modules in accordance with other embodiments in a different manner than is described here. In addition, each module in FIG. 4 may be implemented by a set of computers operating in parallel to further improve efficiency. As illustrated, the server 120 includes a crawling module 350, an indexing module 360, a search engine module 370, a grouping module 380, and a data store 390.

The crawling module 350 creates a design example corpus by retrieving UI contents such as web pages, desktop graphical UI, and Android interface designs. For example, the crawling module 350 visits the web server 130 to systematically retrieve web pages hosted thereon. The crawling module 350 analyzes the harvested design examples to identify UI components included therein and determine attributes of the identified UI components. In one embodiment, the crawling module 350 analyzes the design examples based on the specific formats of the design examples. For example, for a web page in hypertext markup language (HTML), the crawling module 350 analyzes the HTML code of the web page according to the data structure and/or grammar of HTML to identify the UI components of the web page and their attributes. Additionally or alternatively, the crawling module 350 may apply a computer vision-based approach to analyze the UI components of each design example.

The indexing module 360 indexes the design examples retrieved by the crawling module 350 using attributes of UI components included in the design examples. As described above, a design example includes one or more UI components (e.g., regions, texts, images, and buttons), each of which includes attributes (e.g., location, length, height, background, font, and layout) that collectively define the UI component in the design example it belongs to. For example, the background attribute is an integer that represents a color value or a texture identifier of the background of the associated UI component.

In one embodiment, instead of indexing all design examples retrieved by the crawling module 350, the indexing module 360 only indexes a design example if the design example is sufficiently different from any of the already indexed design examples. The indexing module 360 measures the differences between a first design example and a second design example by calculating (1) a minimum transformation cost for transforming UI components in the first design example into UI components in the second design example, (2) a minimum transformation cost for transforming UI components in the second design example into UI components in the first design example, and (3) a combination (e.g., average) of the two costs (also called the "combination score"). One example method to calculate the minimum transformation cost is defined in the following equation:

$$\text{Cost} = w_a \|\text{additions}\| + w_d \|\text{deletions}\| + w_g \text{geometricCost},$$

where $w_a$ is the weight assigned for each addition operation, $\|\text{additions}\|$ is the total number of addition operations, $w_d$ is the weight assigned for each deletion operation, $\|\text{deletions}\|$ is the total number of deletion operations, $w_g$ is the weight assigned to the geometric costs defined using the following equation:

$$\text{geometricCost} = w_{translation} \Sigma dis + w_{scale} \Sigma \text{scaling}.$$

where $w_{translation}$ is the weight assigned for edits corresponding to each edit distance dis, and $w_{scale}$ is the weight assigned for each scaling operation scaling. In the above example, the weights for addition and deletion are different, and as a result the cost function is not symmetric.

For example, if the combination scores for a design example against all indexed design example exceeds a predetermined threshold value, then the indexing module 360 considers the design example sufficiently distinctive and indexes the design example; otherwise the design example is skipped and not indexed. In one example, the indexing module 360 simplifies contents from the design example that are unrelated to the graphical design of the UI components (e.g., replacing the actual texts with phrases such as "text", and replacing the actual images with blank images or images with phrases such as "image") before indexing the resulting simplified design examples.

The search engine module 370 receives UI queries from the client 110 and searches for design examples in the indexing module 360. In one embodiment, the search engine module 370 calculates a minimum transformation cost for each indexed design example measuring the similarity between the layout of the UI components specified in the UI query and the layout of the corresponding UI components in the design examples, and retrieves design examples with minimum transformation costs smaller than a predetermined threshold value as the search results for the UI query.

The grouping module 380 groups the design examples in the search results for common regions among the design examples. The grouping module 380 first calculates a combination score for each pair of design examples in the search results, and groups the design example pairs with small combination scores (e.g., comparing to a predetermined threshold value) into a same layout group and separates the design examples in pairs with high combination scores. Similarly, the grouping module 380 quantifies the differences of backgrounds (e.g., color differences) among design examples in a same layout group, and groups the design examples with similar backgrounds into same background groups within that layout group. Similarly, the grouping module 380 quantifies the differences of fonts (e.g., size, style) among design examples in a same background group, and groups the design examples with similar fonts into same font groups within that background group. The grouping module 380 returns the grouped design examples to the client 110 as search results of the received UI query.

The data store 390 stores data used by the server 120. Examples of such data include the design example corpus, the received UI queries, and the grouped design examples in the search results. The data store 390 may be a relational database or any other type of database, or an in-memory data-structure.

Overview of Methodology

Figure 4:
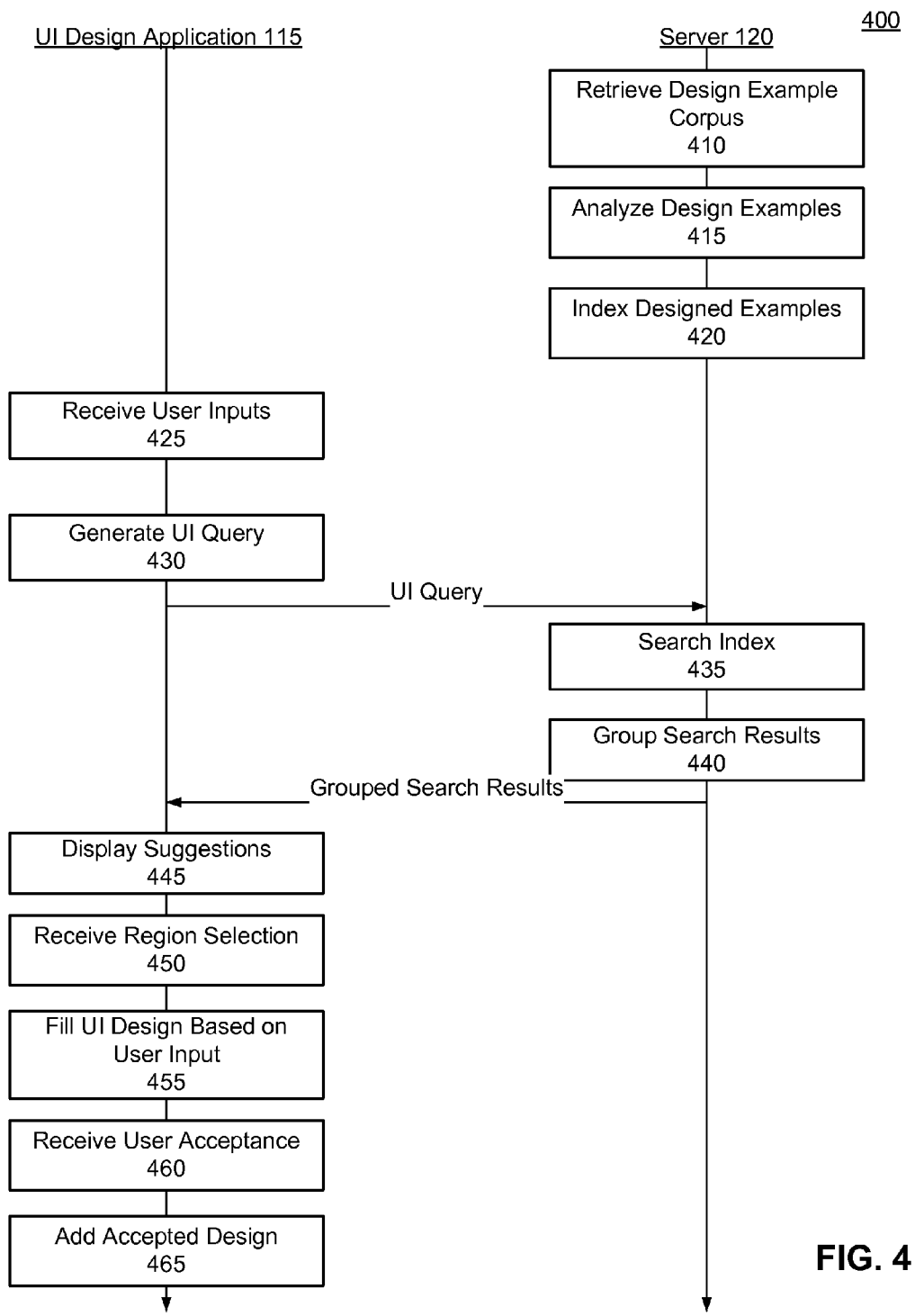
FIG. 4 is a diagram illustrating a process for automatically completing a partially completed UI design created by a designer, according to one embodiment.

FIG. 4 is a time sequence diagram illustrating a process 400 for the UI design application 115 to automatically generate a design for a partially completed UI design, according to one embodiment. Other embodiments can perform the steps of the process 400 in different orders. Moreover, other embodiments can include different and/or additional steps than the ones described herein.

Initially, the server 120 retrieves 410 a large corpus of design examples, for example, by crawling the web server 130 for web pages hosted thereon. The server 120 analyzes 415 the design examples in the corpus to identify UI components included therein and determine the attributes of the identified UI components. The server 120 then indexes 420 the design examples against their UI components in an index.

The UI design application 115 executing on the client 110 receives 425 a user input to create a UI design. The UI design application 115 may receive subsequent user inputs to add one or more UI components on to the partially completed UI design (the existing UI components). An example partially completed UI design is illustrated in FIG. 5A. Referring again to FIG. 4, the UI design application 115 generates 430 a UI query with attributes of the existing UI components, and transmits the UI query to the server 120.

The server 120 receives the UI query and searches 435 in the index for design examples with UI components similar to the existing UI components specified in the UI query. In one embodiment, the server 120 calculates minimum transformation costs between such UI components, and includes design examples with costs less than a predetermined threshold value in search results for the UI query. The server 120 groups (and/or subgroups) 440 the design examples for designs of common regions according to attributes such as layout, background, and font, and transmits the grouped design examples to the UI design application 115.

The UI design application 115 displays 445 the layout of a representative design example in one of the layout groups along with the existing UI components to complete the UI design. On exemplary auto-completed UI design is illustrated in FIG. 5B. Referring again to FIG. 4, the UI design application 115 receives 450 a user selection of a region in the automatically completed UI design, and displays a detail slider 560 and an example slider 570 next to the selected region, as illustrated in FIG. 5C. The UI design application 115 fills 455 the selected regions with suggested displays based on user interactions with the two scrollbars. The user can scroll the detail slider 560 to control the level of groups (e.g., layout groups, background groups, font groups) to view, and scroll the example slider 570 to navigate through the representative design examples. FIG. 5D illustrates the designer scrolling the example slider to view suggested layouts for the selected region, FIG. 5E illustrates the designer scrolling the example slider to view suggested backgrounds for the selected region, FIG. 5F illustrates the designer scrolling the example slider to view suggested fonts for the selected region, and FIG. 5G illustrates the designer scrolling the example slider to view a specific design example for the selected region.

Referring again to FIG. 4, the UI design application 115 receives 460 a user acceptance for a currently displayed design for the selected region, and adds 465 the design into the partially complete UI design.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying documents sharing common underlying structures in a large collection of documents and processing the documents using the identified structures. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

What is claimed is:

1. A computer-implemented method of assisting a user to design a user interface (UI), comprising:
   receiving a command to automatically generate a design for an incomplete UI design, the incomplete UI design comprising a user-selected UI component;
   identifying a design example comprising a corresponding UI component, similar to the user-selected UI component, and a recommended UI component; and
   providing the recommended UI component for display in the incomplete UI design.

2. The method of claim 1, wherein the identifying comprises comparing a transformation cost with a threshold value, the transformation cost corresponding to a categorization of similarity between the user-selected UI component and the corresponding UI component.

3. The method of claim 2, wherein the user-selected UI component comprises first text and the corresponding UI component comprises second text, and wherein differences between the first and second texts do not contribute to the transformation cost.

4. The method of claim 2, wherein the user-selected UI component comprises a first image and the corresponding UI component comprises a second image, and wherein differences between the first and second images do not contribute to the transformation cost.

5. The method of claim 1, wherein the recommended UI component comprises text, and wherein providing the recommended UI component for display includes replacing the text with default text.

6. The method of claim 1, wherein the recommended UI component comprises an image, and wherein providing the recommended UI component for display includes replacing the image with a default image.

7. The method of claim 1, further comprising:
responsive to receiving a user command confirming the recommended UI component, incorporating the recommended UI component as part of the incomplete UI design.

8. The method of claim 1, wherein the design example is among a plurality of design examples in a plurality of layout groups, each layout group comprising one or more design examples with similar layouts, the method further comprising:
receiving a user identification of a selected layout group; and
providing user choices from the selected layout group.

9. The method of claim 8, wherein the user choices include subgroups.

10. The method of claim 8, further comprising:
providing for display a first scrollbar for a user to select one of a layout group level and a subgroup level; and
providing for display a second scrollbar for the user to display UI components in a group corresponding to a level selected by the user through the first scrollbar.

11. A computer program product that comprises a non-transient computer readable storage medium containing computer executable instructions for assisting a user to design a user interface (UI), comprising:
instructions to process a command to automatically generate a design for an incomplete UI design, the incomplete UI design comprising a user-selected UI component;
instructions to identify a design example comprising a corresponding UI component similar to the user-selected UI component and a recommended UI component; and
instructions to provide the recommended UI component for display in the incomplete UI design.

12. The computer program product of claim 11, wherein the instructions to identify comprise instructions to compare a transformation cost with a threshold value, the transformation cost corresponding to a categorization of similarity between the user-selected UI component and the corresponding UI component.

13. The computer program product of claim 12, wherein the user-selected UI component comprises first text and the corresponding UI component comprises second text, and wherein differences between the first and second texts do not contribute to the transformation cost.

14. The computer program product of claim 12, wherein the user-selected UI component comprises a first image and the corresponding UI component comprises a second image, and wherein differences between the first and second images do not contribute to the transformation cost.

15. The computer program product of claim 11, wherein the recommended UI component comprises text, and wherein the instructions to provide comprise instructions to replace the text with default text.

16. The computer program product of claim 11, wherein the recommended UI component comprises an image, and wherein the instructions to provide comprise instructions to replace the image with a default image.

17. The computer program product of claim 11, further comprising:
instructions to incorporate the recommended UI component as part of the incomplete UI design responsive to receiving a user command confirming the recommended UI component.

18. The computer program product of claim 11, further comprising:
instructions to, responsive to a user command confirming the recommended UI component, incorporate the recommended UI component as a part of the incomplete UI design.

19. The computer program product of claim 11, wherein the design example is among a plurality of design examples in a plurality of layout groups, each layout group comprising one or more design examples with similar layouts to the incomplete UI design, the instructions further comprising:
instructions to receive a user command identifying a selected layout group and provide user choices from within the selected layout group.

20. The computer program product of claim 19, wherein the user choices include subgroups.

21. The computer program product of claim 19, further comprising:
instructions to provide for display a first scrollbar for a user to select one of a layout group level and a subgroup level; and
instructions to provide for display a second scrollbar for the user to display UI components in a group corresponding to a level selected by the user through the first scrollbar.

* * * * *